(12) United States Patent
Torres Planells et al.

(10) Patent No.: US 12,346,755 B2
(45) Date of Patent: Jul. 1, 2025

(54) DETERMINING PRINT MODES OF PRINT APPARATUSES

(71) Applicant: Hewlett-Packard Development Company, L.P., Spring, TX (US)

(72) Inventors: Maria Nieves Torres Planells, Sant Cugat del Valles (ES); Javier Castro Soriano, Sant Cugat del Valles (ES); Alexandre Rodriguez Llofriu, Sant Cugat del Valles (ES); Maurizio Bordone, Sant Cugat del Valles (ES)

(73) Assignee: HEWLETT-PACKARD DEVELOPMENT COMPANY, L.P., Spring, TX (US)

( * ) Notice: Subject to any disclaimer, the term of this patent is extended or adjusted under 35 U.S.C. 154(b) by 0 days.

(21) Appl. No.: 18/263,396

(22) PCT Filed: Jan. 29, 2021

(86) PCT No.: PCT/US2021/015660
§ 371 (c)(1),
(2) Date: Jul. 28, 2023

(87) PCT Pub. No.: WO2022/164440
PCT Pub. Date: Aug. 4, 2022

(65) Prior Publication Data
US 2024/0028853 A1    Jan. 25, 2024

(51) Int. Cl.
*G06K 15/02*    (2006.01)

(52) U.S. Cl.
CPC ....... *G06K 15/188* (2013.01); *G06K 15/1884* (2013.01)

(58) Field of Classification Search
None
See application file for complete search history.

(56) References Cited

U.S. PATENT DOCUMENTS

| | | | |
|---|---|---|---|
| 6,669,331 B2 | 12/2003 | Teshigawara et al. | |
| 7,819,497 B2 | 10/2010 | Konno et al. | |
| 8,390,829 B2 | 3/2013 | Dibiase et al. | |
| 8,962,111 B2 | 2/2015 | Zhou et al. | |
| 9,628,651 B2 | 4/2017 | Martinez et al. | |
| 2005/0018222 A1 | 1/2005 | Yoshida | |
| 2013/0201268 A1 | 8/2013 | Zhou et al. | |
| 2014/0063105 A1* | 3/2014 | Couwenhoven ....... | B41J 2/2132 347/15 |

(Continued)

FOREIGN PATENT DOCUMENTS

| | | |
|---|---|---|
| CN | 103153635 A | 6/2013 |
| CN | 109414937 A | 3/2019 |

*Primary Examiner* — Lennin R Rodriguezgonzalez
(74) *Attorney, Agent, or Firm* — Jordan IP Law, LLC

(57) ABSTRACT

A print mode determination method is disclosed. The method comprises receiving image data defining parameters of pixels of an image to be printed using a print apparatus; identifying, based on the image data, a first fill area in the image that exceeds a defined threshold area, wherein the first fill area is to be printed in a first color; determining, based on the image data, a first proportion of print agent of each of a plurality of colors to be used to print the first color; and determining, based on the determined first proportions of print agent, a print mode to be used by the print apparatus to print the image. An apparatus and a machine-readable medium are also disclosed.

16 Claims, 4 Drawing Sheets

(56) References Cited

U.S. PATENT DOCUMENTS

| | | |
|---|---|---|
| 2014/0176966 A1 | 6/2014 | Kuno |
| 2017/0111540 A1 | 4/2017 | Gracia Verdugo et al. |
| 2019/0281191 A1 | 9/2019 | Morovic et al. |

* cited by examiner

DETERMINING PRINT MODES OF PRINT APPARATUSES

BACKGROUND

A print apparatus may be used to print an image according to image data, for example by depositing print agent onto a printable medium in a particular manner in accordance with the image data. In some cases, particular conditions associated with the print apparatus or the print agent (e.g. ink) used to print the image may lead to the occurrence of print defects in the printed image. An example of a print defect that may occur is sometimes referred to as "banding", which appears as bands extending across the printed image.

BRIEF DESCRIPTION OF DRAWINGS

Examples will now be described, by way of non-limiting example, with reference to the accompanying drawings, in which.

DETAILED DESCRIPTION

Figure 1:
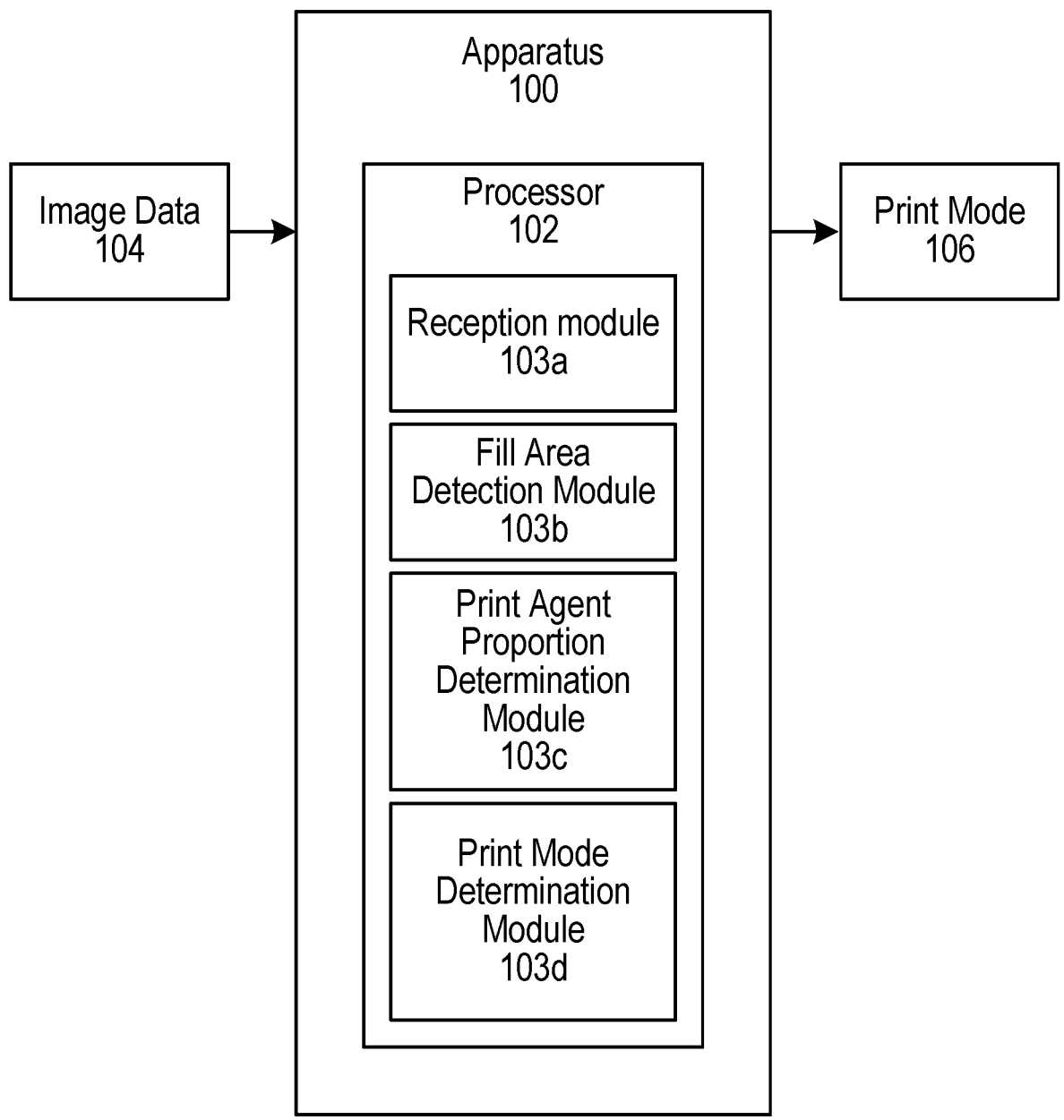
FIG. 1 is a schematic illustration of an example of apparatus for determining a print mode of a print apparatus.

Examples disclosed herein provide a mechanism by which an appropriate print mode of a print apparatus can be determined automatically based on the image to be printed, without the image being printed and analyzed to identify any print defects. A print mode of a print apparatus may define configuration parameters or settings to be used by the print apparatus when performing a printing operation. For example, print modes may comprise, amongst other things, the number of times that a print agent distributor (e.g. a print head) is to pass over a region of a printable medium while printing a swath (sometimes referred to as the number of printing passes). When a print apparatus performs a printing operation using a print mode that involves a relatively low number of printing passes (e.g. 6 passes), a relatively larger amount of print agent may be deposited from the print head during each printing pass and, conversely, when a print apparatus performs a printing operation using a print mode that involves a relatively large number of printing passes (e.g. 12 passes), a relatively smaller amount of print agent may be deposited from the print head during each printing pass. Different print modes may have different effects on the printing operation, such as the total time to perform the printing operation, the quality of the image printed as a result of the printing operation, the drying procedure to be used to drive the printed image, and the like. By selecting an appropriate print mode for a printing operation, a printed image having an intended quality can be achieved, and the likelihood of a print defect (also referred to as an image quality defect) occurring in the printed image during the printing operation may be reduced, resulting in a printed image with fewer defects.

One example of a print defect that can occur in a printed image is referred to as banding, or dark line zone banding. Printed images that include banding may have a region or regions within which strips or bands are visible across the image. Banding and other print defects may be especially perceptible or noticeable in regions of the printed image containing a block or area of a particular color. Such areas are sometimes referred to as area fills of color blocks. An area fill may, for example, comprise a region in which a single color is to be printed in the image. Other factors that may affect the occurrence of banding in a printed image and the severity of the banding may include, among other things, the order in which print agent is deposited onto the printable medium, the velocity at which the print head moves over the printable medium while the print agent is deposited and the print agent formulation.

Examples disclosed herein may be used with any type of print apparatus, and in respect of any type of printing operation. One example of a type of print apparatus in respect of which the present disclosure may be used is a print apparatus that prints using latex print agent. Such a print apparatus may be referred to as a latex printer. The present disclosure can be used in respect of print agent of any color. In one example, examples present disclosure may be applied in respect of a print apparatus that is capable of printing an image using print agent of four different colors: cyan (C), yellow (Y), magenta (M) and black (K).

The print mode to be used by a print apparatus when performing a printing operation may be selected manually by an operator of the print apparatus or it may be selected automatically by the print apparatus or by a computing device or processing apparatus capable of operating or controlling an aspect of the print apparatus. In some examples, the print apparatus or an associated computing device or processing apparatus may establish an appropriate print mode to be used, which is provided to an operator as a recommendation. The operator may select the recommended print mode or any other print mode.

In some examples, the computing device or processing apparatus that is to determine an appropriate print mode to be used by the print apparatus may be implemented in an apparatus or device. FIG. 1 is a schematic illustration of an example of an apparatus 100. The apparatus 100, which may be referred to as a print mode determination apparatus, comprises a processor 102. Thus, the apparatus 100 may, in some examples, comprise a computing device such as a desktop computer, laptop computer, a tablet computer, a smart phone, a wearable device, or a print apparatus (e.g. a printer of the types discussed herein).

The processor 102 may include modules to perform various functions. In some examples, the processor 102 includes a reception module 103*a*, a fill area detection module 103*b*, a print agent proportion determination module 103*c* and a print mode determination module 103*d*. The processor 102 (e.g. reception module 103*a* of the processor) is to receive image data 104 representing an image to be printed using a print apparatus. The image data 104 may be received in the form of an image file or in some other format suitable for use by the print apparatus to print the image. The image data 104 may define parameters of pixels of the image to be printed. The pixel parameters defined in the image data 104 may, for example, include data indicative of a color of each of the pixels in the image. The color of the pixel in an image may be defined in terms of an amount of red (R), green (G) and blue (B) used to create the intended pixel color, sometimes referred to as continuous tone or contone values. When a color of a particular pixel defined in terms of an RGB color set is to be printed, the color of the pixel may be alternatively defined in terms of a combination of colors of print agent that are to be delivered or deposited at a print addressable location corresponding to the pixel. For example, in a printer that is to print images using cyan, magenta, yellow and black print agent (CMYK), the intended color of each pixel in the image may be defined in terms of the amount of cyan, magenta, yellow and black print agent that is to be used in order to achieve the intended color. In some examples, the image data 104 may define parameters the pixels of the image to be printed in terms of CYMK values, representing the proportions of print agent of different colors to be printed at each print addressable location.

The processor 102 (e.g. the fill area detection module 103b of the processor) is to identify, based on the image data 104, a color block of a first color in the image, the color block having an area that exceeds a defined threshold area. The color block may be referred to as a first fill area. Thus, the processor 102 may identify a first fill area in the image that exceeds a defined threshold area, wherein the first fill area is to be printed in a first color. As noted previously, some print defects such as banding are particularly perceptible in fill areas of an image, where print agent of a particular color is deposited in a single, continuous block or region. Banding appears as a strip or strips extending across a printed image in a direction parallel to a scan direction of the print head of the print apparatus printing the image. The scan direction is the direction in which the print head traverses the printable medium as print agent is deposited during printing operation. Due to the nature of banding, this print defect may not be perceptible in fill areas in the image that have a dimension (e.g. a height) less than the corresponding dimension (e.g. a width or thickness) of the band, which may be approximately equal to the swath height of the print head. Thus, according to some examples, fill areas that are small enough such that banding is unlikely to be perceptible in the printed image may be disregarded. Put another way, in some examples, fill areas in the image that exceed a defined threshold area are identified as potentially prone to banding and, therefore, are taken into account, whereas fill areas that do not exceed the defined threshold area are disregarded.

The threshold area may be defined based on various factors including, for example, the type of print apparatus, parameters of the print head (e.g. the number of nozzles in the print head), and the swath size of the print head.

The color (i.e. the first color) that is to be printed in the first fill area may be any color, but it will be clear that, to be identified as a fill area, the first fill area will comprise just one color. In some examples, a fill area may be defined as an area in which all of the pixels have substantially the same color. Thus, in some examples, the size of a fill area and/or the threshold area may be measured in terms of a number of pixels contained within a particular area. In other examples, the size of a fill area and/or the threshold area may be measured in some other way, for example in square millimeters, square centimeters, or the like.

Once a first fill area has been identified in the image, the processor 102 (e.g. the print agent proportion determination module 103c of the processor) is to determine, based on the image data, a proportion of each of a plurality of colors of print agent to be used to print the first color. In other words, the processor 102 may determine a first proportion of print agent of each of a plurality of colors to be used to print the first color. In an example, if the processor 102 identifies a first fill area having a color which has a particular shade of blue, then a determination is made about the combination of print agent that is to be deposited in the first fill area in order to create that color. If the print apparatus brings using cyan, magenta, yellow and black print agent, then the blue color may be achieved by depositing a relatively large proportion of cyan print agent, along with a relatively small proportion of magenta print agent. Existing mechanisms (e.g. algorithms or lookup tables) may be used by the processor 102 and/or by the print apparatus to determine the proportion of print agent colors to be used to achieve the intended color in the fill area and, more generally, to achieve the intended color at each pixel of the image.

The proportion of each different print agent color to be deposited at a particular print addressable location may be defined, in one example, in terms of a proportion of the total amount of print agent of a particular color print agent that can be deposited at a print addressable location. This proportion may be defined in terms of percentage. For example, the combination of print agent to be deposited at a particular print addressable location may be 100% cyan (i.e. C:100), 0% magenta (i.e. M:0), 0% yellow (i.e. Y:0) and 0% black (i.e. K:0). Such a combination of print agent would result in a dark cyan color, while a combination of C:20, M:0, Y:0, K:0 would result in a much paler cyan color.

The processor 102 (e.g. the print mode determination module 103d) is then to determine, based on the determined first proportions of print agent, a print mode 106 to be used by the print apparatus to print the image. In some examples, once the combination of print agent colors has been determined, the print mode to be used by of an apparatus may be determined by inspecting or interrogating a lookup table or database. Thus, the processor 102 may determine the print mode based on an inspection of a lookup table or database containing an indication of a corresponding print mode for each of a plurality of combinations of print agent proportions. The print agent proportions may represent the relative proportions of print agent of different colors that are to be used to print the color in the identified first fill area. Such a lookup table or database may, for example, include, for each possible combination of print agent colors, a print mode (e.g. an appropriate or optimum print mode) that has the greatest likelihood of printing the image with little or no banding. Put another way, the processor 102 is to determine the print mode that is intended to give rise to the fewest image quality defects when printing the image. In some examples, the image quality defect may comprise banding defects as discussed herein.

The print mode may, in some examples, define the number of passes to be made by a print agent distributor (e.g. a print head) over a printable medium onto which the image is to be printed by the print apparatus during a printing operation. For example, a first print mode may involve the print agent distributor depositing print agent at a particular print addressable location during 6 printing passes, a second print mode may involve the print agent distributor depositing print agent at a particular print addressable locations during 8 printing passes and a third print mode may involve the print agent distributor depositing print agent at a particular print addressable locations during 12 printing passes. In other examples, other print modes may be used which involve a different number of printing passes. The print mode may, in some examples, define other parameters to be taken into account during the printing operation, such as the speed at which the print head is to move over the printable medium, an amount of print agent deposited during each printing pass, and the like. In some examples, the processor 102 is to determine the print mode further based on the printable medium onto which the image is to be printed by the print apparatus. Print defects, such as banding, may be more perceptible or noticeable to a viewer when particular print agent color combinations are printed onto some types of printable media than others. Therefore, by taking into account the type of printable medium onto which the images to be printed, a print mode can be selected that is appropriate for both the combination of print agent colors to be printed in the fill area and the printable medium onto which they are to be deposited.

The lookup table or database used to determine the print mode may be populated as a result of a testing phase or information gaining phase. During such a phase, an image that includes a fill area of particular color is printed using each available print mode (e.g. using a 6-pass print mode, an 8-pass print mode and a 12-pass print mode) for a print apparatus, and a determination is made, either automatically by image analysis software or manually by an observer, of which print mode results in the highest quality printed image (i.e. the printed image having the smallest amount of banding). The print mode that results in the highest quality image may be associated with a particular print agent type (e.g. composition) and stored in the lookup table or database. In some examples, an amount of banding resulting from each print mode may be associated with the particular print agent type and stored in lookup table or database. The type, composition, color and/or other elements of the print agent may contribute to the amount of banding that results, including, for example, the nature and amount of any pre-treatment or overcoat print agent applied, and the interaction of print agents with one another and/or with the printable medium onto which they are printed.

Figure 2:
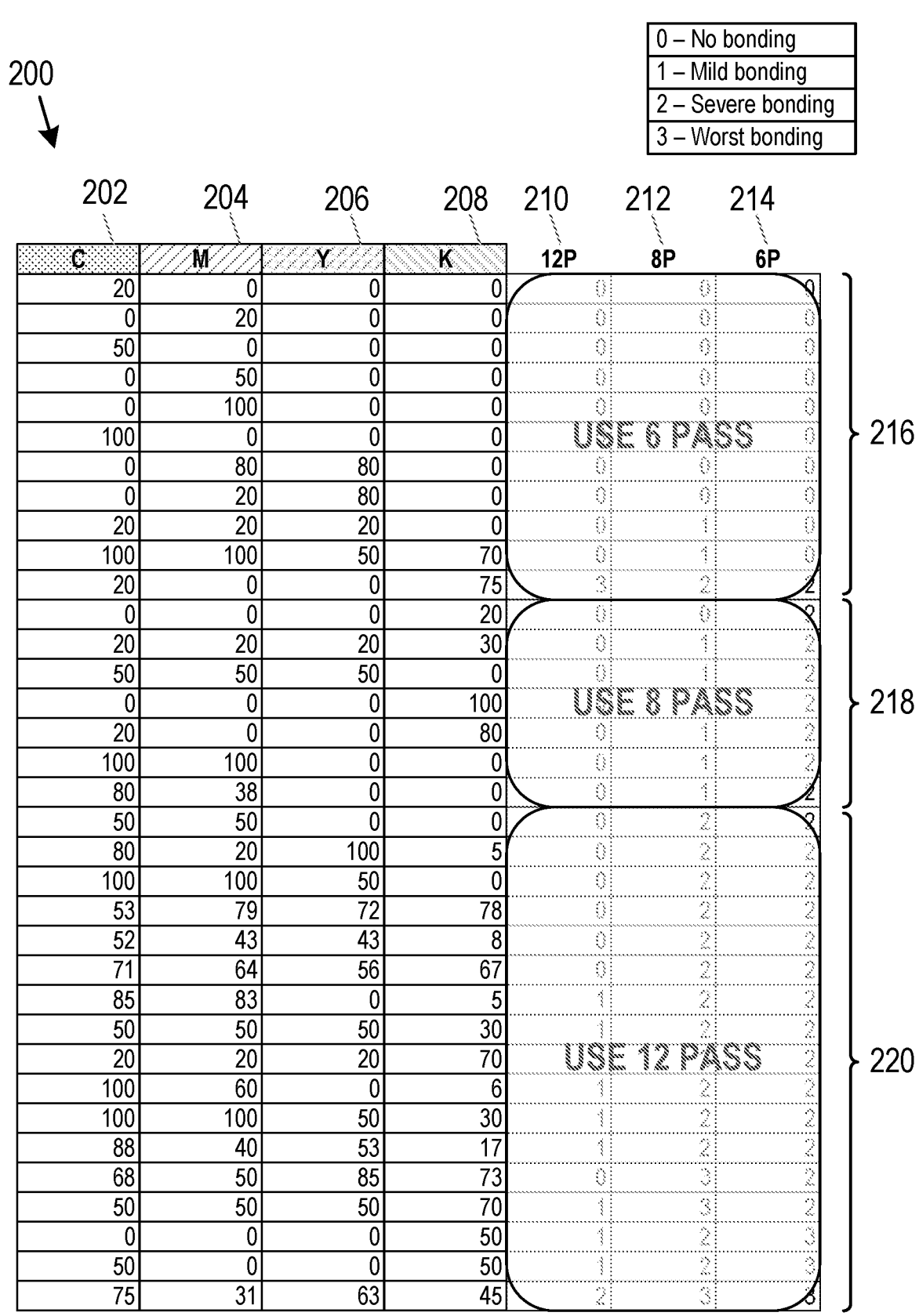
FIG. 2 is a table showing example print modes for use with different print agent combinations.

FIG. 2 is a table 200 showing an example of various associations between print modes and print agent color combinations that may be stored in a lookup table or database. The columns 202, 204, 206 and 208 indicate, for each combination of print agent colors, a proportion of cyan, magenta, yellow and black print agent, respectively, that is to be deposited to achieve the intended color. For example, the color represented in the first row of the table 200 is achieved by depositing just 20% of the maximum amount of cyan print agent that could be deposited at a particular print addressable location. The color represented in the bottom row of the table 200 is achieved by depositing the following combination of print agent: C: 75, M: 31, Y: 63, K: 45. To the right of the columns 202 to 208, columns 210, 212 and 214 indicate, respectively, an amount of banding that results for each color combination in the table 200 when a 12-pass print mode is used (column 210), when and 8-pass print mode is used (column 212) and when a 6-pass a print mode is used (column 214). The amount of banding that occurs when a particular print mode is used is indicated on a scale of 0 to 4, where 0 represents no perceptible banding, 1 represents mild banding, 2 represents more severe banding and 3 represents the worst banding.

In some examples, the proportion of each print agent color may be included in the lookup table or database as a range. For example, a proportion of a print agent color in a particular combination may be given as 10+/−5, or ranges or 0 to 5, 5 to 10, and so on. In this way, the lookup table or database can include fewer entries, rather than all possible combinations of print agent proportions. In other examples, if a particular combination of print agent proportions is not included in a lookup table or database, then the print mode may be determined based on the nearest available combination of proportions (e.g. the closest color), for example calculated numerically from the proportions.

An operator of a print apparatus may have their own preference of a particular print mode to use when performing a printing operation. For example, printing an image using a 6-pass print mode may be significantly quicker than using a 12-pass print mode, and may, in some examples, consume less print agent. However, in most cases, a print mode in which a greater number of printing passes is made will result in a higher quality image. Therefore, it may be acceptable to some print apparatus operators to that results in a small amount of banding. According to this example, the table 200 includes indications of which of the available print modes will be the print mode determined by processor 102 to be used by the print apparatus. For example, for images having a fill area of a color generated by a combination of print agent appearing at the top of the table 200, labelled 216, the processor 102 will determine that a 6-pass print mode is appropriate; for images having a fill area of a color generated by a combination of print agent appearing in the middle of the table, labelled 218, the processor will determine that an 8-pass print mode is appropriate; and, for images having a fill area of a color generated by a combination of print agent appearing at the bottom of the table, labelled 220, the processor will determine that a 12-pass print mode is appropriate. As is clear from the table, the print mode that is determined by the processor 102 is the print mode that results in the least severe banding.

Once a print mode has been determined by the processor 102, the processor may operate the print apparatus to print the image using the determined print mode. For example, a print apparatus operator may accept the print mode determined by the processor 102 and the print apparatus may therefore print the image using the print mode determined by the processor. In other examples, the processor 102 may provide the determined print mode of the print apparatus as a recommendation to an operator of the print apparatus. For example, the processor 102 may provide the determined print mode for presentation on a user interface (e.g. a user interface of the print apparatus), indicating to an operator that the determined print mode is recommended for the image that is to be printed. This way, the operator may choose to accept the recommended print mode or, alternatively, may select a different print mode to be used. In such examples, the processor 102 may receive, from an operator, a selection of a print mode of the print apparatus to be used to print the image. The processor 102 may then operate the print apparatus to print the image using the selected print mode. As noted, the selected print mode may or may not comprise the recommended print mode, as determined by the processor 102. In some examples, the print apparatus may be to print the image using latex print agent (e.g. latex inks).

In the examples discussed above, it is assumed that a single fill area is identified in the image to be printed, and the print mode to be used is determined based on the color of the fill area. However, an image may include multiple fill areas, each exceeding the defined threshold area and each of a different color. In such cases, the processor 102 may determine a print mode for each of the identified fill areas, or for each different color to be printed, resulting in a plurality of print modes. In some examples, each determined print mode may be provided to an operator for selection of a print modes to be used. In other examples, the processor 102 may select the print mode, from the plurality of print modes, which involves the greatest number of printing passes, and which is most likely to result in a printed image with the least amount of perceptible banding.

In other examples in which multiple fill areas are identified in an image to be printed, the determination of the print mode to be used may be based on the sizes of the fill areas identified. For example, if one fill area identified in an image is significantly larger than any other fill areas, then the largest fill area may include the most perceptible banding. Thus, the print mode determined by the processor 102 may be the one that results in the least banding in the largest identified fill area. In some examples, therefore, the processor 102 may identify, based on the image data, a second fill area in the image that exceeds a defined threshold area, wherein the second fill area is to be printed in a second color. The second color may, for example, be different to the first color. The processor 102 may determine, based on the image data, a second proportion of print agent of each of a plurality of colors to be used to print the second color. This may be done in the same way that the processor determines the first proportion of print agent of each of a plurality of colors to be used to print the first color. For example, an algorithm or lookup table may be used to determine which combination of print agent colors is to be used to create the intended second color. In other examples, a conversion technique may be used to convert the first and/or second colors from a first color space (e.g. RGB) into a second color space (e.g. CYMK).

The processor 102 may then determine which of the first fill area and the second fill area is the largest. As noted above, the areas of the fill areas may be measured in terms of pixels or in terms of some of the measurement, such as millimeters squared, centimeters squared, or the like. Once the largest fill area has been identified, the processor 102 may determine, based on the determined proportions of print agent for the largest fill area, a print mode to be used by the print apparatus to print the image. Thus, the print mode to be used to print the image may be selected on the basis of the color of the largest fill area, based on the assumption that banding appearing in the largest fill area is more likely to be perceptible to a viewer than banding appearing in smaller fill areas in the image.

It is noted above that the processor 102 identifies a first fill area (or multiple fill areas) that exceeded a defined threshold area. In some examples, however, the processor 102 may also determine whether the fill area meets a certain shape criterion. For example, a long thin strip appearing in the image may have an area that exceeds the defined threshold area and, therefore, would be identified by the processor 102 as a fill area. However, such a long thin strip may be too narrow to show banding in a way that is perceptible to a viewer. Therefore, the processor 102 may take into account the shape of the fill area or a geometrical distribution of pixels within the fill area, and a print mode may be determined for a fill area if the shape of the fill area (or the geometrical distribution of pixels within the fill area) meet certain defined criteria. In one example, a print mode may be determined based on a fill area if the fill area has a width/height greater than a defined width/height, the defined width/height being the minimum width/height that banding is likely to be perceptible. The width/height of the fill area at which banding becomes perceptible may, for example, be related to the number of consecutive nozzles present in a print head (i.e. a print agent applicator). In other examples, a print mode may be determined based on a fill area if the fill area is not of a particular shape, such as a thin line. More generally, the processor 102 may, in some examples, determine, based on the image data, a geometrical distribution of pixels within the first fill area. The processor 102 may determine the print mode further based on the determined geometrical distribution of pixels within the first fill area. For example, if it is determined that the geometrical distribution of pixels within the first fill area meets a defined criterion (e.g. has a width, thickness or height greater than a defined threshold), then it may be determined that the first fill area is likely to include some degree of banding and, therefore, a print mode may be selected that minimizes the occurrence of banding in the first fill area. Similarly, if it is determined that the geometrical distribution of pixels within the first fill area does not meet a defined criterion (e.g. has a width, thickness or height less than a defined threshold), then it may be determined that the first fill area is unlikely to include any banding and, therefore, a print mode may be selected based on the color of a different fill area (e.g. the second fill area).

Thus, the processor 102 is, in some examples, to determine, based on the image data, a geometrical distribution of pixels within the first fill area. When a criterion regarding the shape of the first fill area is to be satisfied in order for the print mode to be selected based on the color of the first fill area, the processor 102 may check whether the criterion has been satisfied before determining the print mode. Thus, the processor 102 may, responsive to determining that the geometric distribution of pixels within the first fill area meets a defined criterion, determine the print mode further based on the determined geometrical distribution of pixels within the first fill area.

Figure 3:
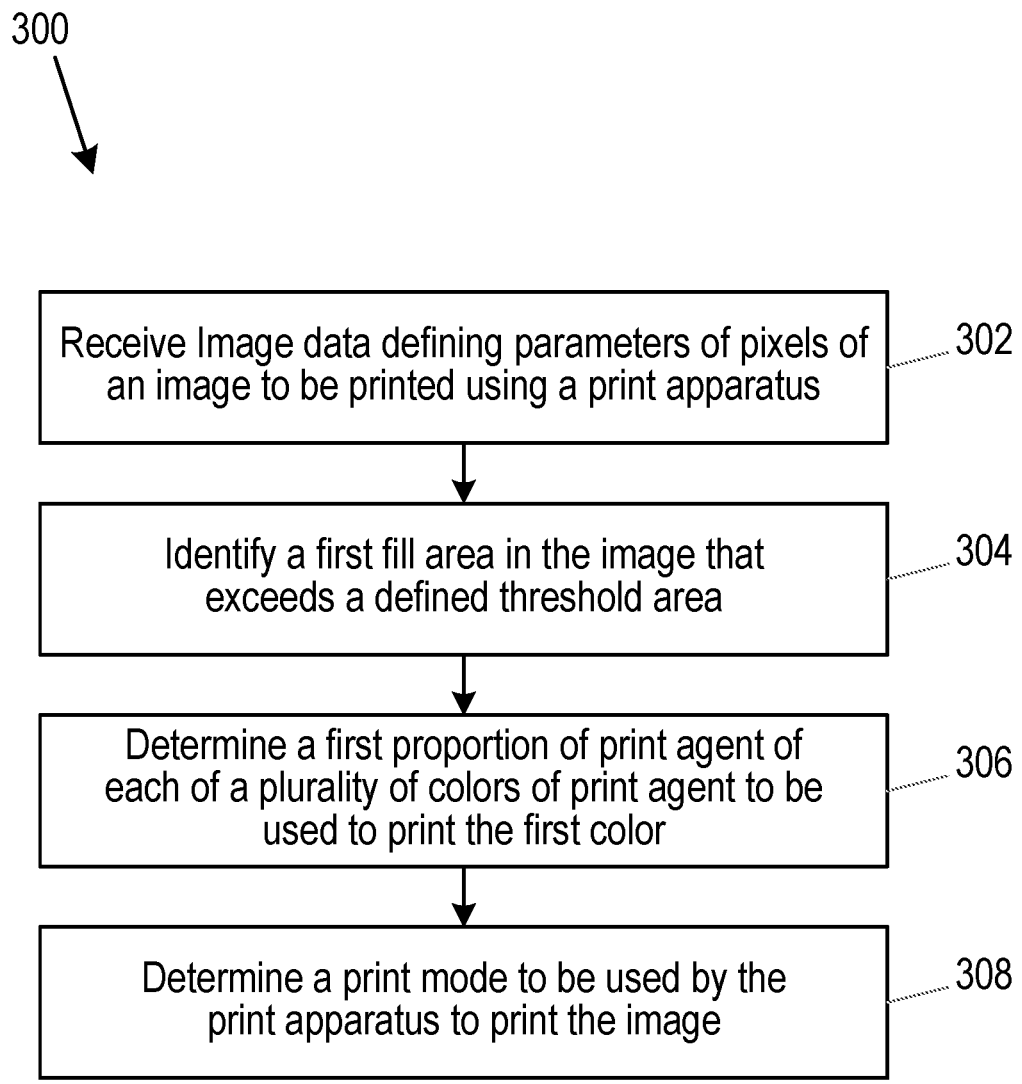
FIG. 3 is a flowchart of an example of a print mode determination method.

Examples of the present disclosure also relate to a method. FIG. 3 is a flowchart of an example of a method 300, such as a print mode determination method. In some examples, the method 300 may comprise a computer-implemented method. Thus, the method 300 may using a processor or multiple processors, for example a processor of a computing device or a print apparatus. The method 300 comprises, at block 302, receiving, using a processor (e.g. the processor 102), data representing an image to be printed using a print apparatus. The data may comprise image data as discussed above, such as data that defines parameters of pixels of an image to be printed. At block 304, the method 300 comprises identifying, using a processor and based on the image data, a color block of a first color in the image, the color block having an area that exceeds a defined threshold area. A color block may comprise or be similar to a fill area as discussed above. Thus, block 304 may involve identifying a first fill area in the image that exceeds a defined threshold area, wherein the first fill area is to be printed in a first color. Such a block of color or fill area may be of any shape. A region of an image may be considered to be a color block if the pixels within the region are contiguous and of the same color, and the total size (i.e. area) of the region exceeds the defined threshold area.

The method 300 comprises, at block 306, determining, using a processor and based on the image data, a first proportion of print agent of each of a plurality of colors to be used to print the first color. In other words, block 306 may involve determining a proportion of each of the plurality of colors of print agent to be used to print the first color. For example, in a print apparatus that is to print an image using C, M, Y and K print agent, then block 306 involves determining the proportion of C, M, Y and K print agent that is to be used to print the first color. As discussed above, this determination may involve the use of a lookup table or an algorithm or a conversion from one color space to another color space, such as a conversion from the color space used in the data received at block 302 into the color space of the print apparatus. At block 308, the method 300 comprises determining, using a processor and based on the determined proportions of print agent, a print mode to be used by the print apparatus to print the image. As discussed above, one way in which the determination of block 308 may be made is with the use of a lookup table or database containing an indication of an appropriate print mode to be used for each possible combination of print agent colors.

The method 300 may, in some examples, comprise other blocks corresponding to functions performed using the processor 102, as described herein.

Figure 4:
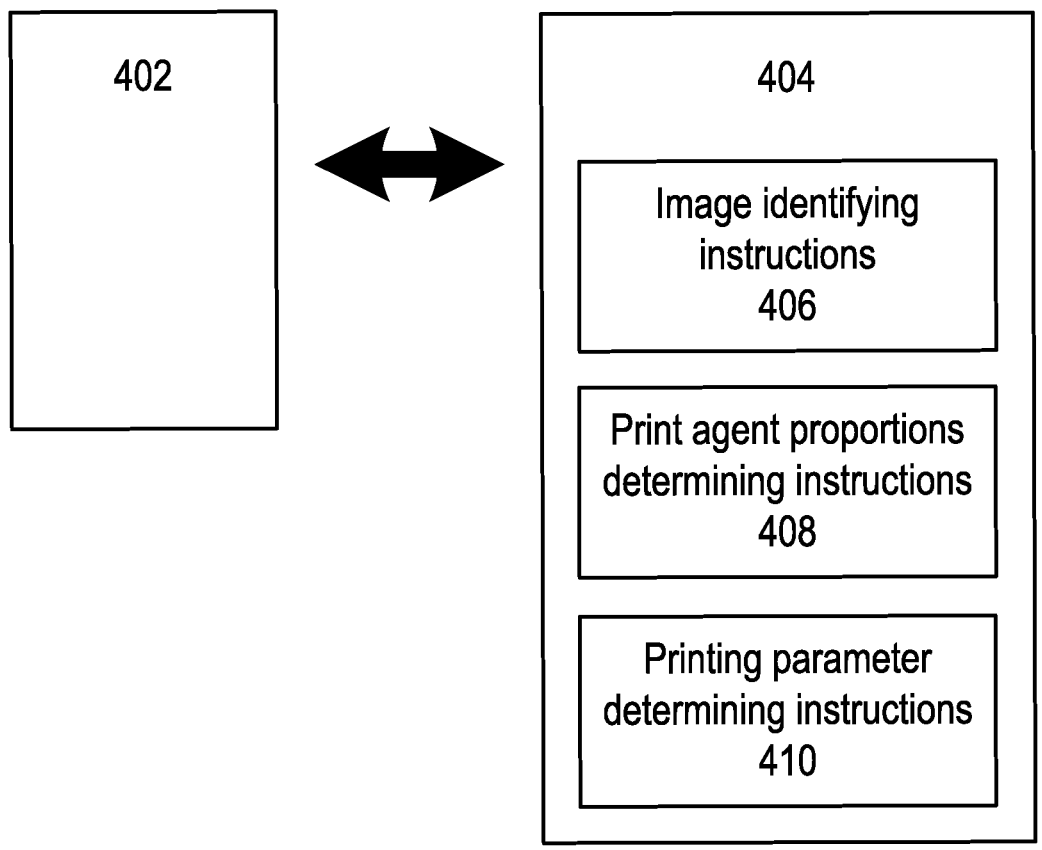
FIG. 4 is a schematic illustration of an example of a processor in communication with a machine-readable medium.

Examples of the present disclosure also relate to a machine-readable medium. FIG. 4 is a schematic illustration of an example of a processor 402 in communication with a machine-readable medium 404. According to some examples, the machine-readable medium 404 comprises instructions (e.g. image identifying instructions 406) which, when executed by the processor 402, cause the processor to identify, from data representing an image to be printed using a print apparatus, a first color fill region having an area that exceeds a defined threshold area, wherein the first color fill area is to be printed in a first color. In some examples, the machine-readable medium may comprise instructions which can cause the processor to receive or obtain the data representing the image to be printed, prior to identifying the first color fill region. The machine-readable medium 404 further comprises instructions (e.g. print agent proportions determining instructions 408) which, when executed by the processor 402, cause the processor to determine, from the data, a proportion of print agent of each of a plurality of colors to be used to print the first color. The machine-readable medium 404 further comprises instructions (e.g. printing parameter determining instructions 410) which, when executed by the processor 402, cause the processor to determine, based on the determined proportions of print agent, printing parameters to be applied to the print apparatus to print the image. The printing parameters may comprise, form or be referred to as a print mode. In some examples, the printing parameters may comprise an indication of a number of printing passes to be made by a print head (i.e. a print agent distributor) of the print apparatus when depositing print agent at a print addressable location of the printable medium (e.g. a number of printing passes to be made when printing a swath).

In other examples, the machine-readable medium 404 may further comprise instructions which, when executed by the processor 402, cause the processor to perform blocks of the methods disclosed herein and/or functions performed using the processor 102 described above.

Examples described herein provide a mechanism by which an appropriate print mode of a print apparatus may be determined based on analysis of an image to be printed, prior to starting the printing operation. In this way, an operator of the print apparatus is able to print an image using the most appropriate print mode (e.g. the print code likely to produce the least bounding) without performing tests (e.g. printing tests). Thus, the preparation time spent prior to printing an image can be reduced, which may lead to a consequential reduction in costs associated with print operations. In addition, images can be printed with less perceptible banding and, therefore, generally higher quality. Once the lookup table or database has been compiled for a particular set of print agent colors, it can be used for any image to be printed using those print agent colors.

Examples in the present disclosure can be provided as methods, systems or machine-readable instructions, such as any combination of software, hardware, firmware or the like. Such machine-readable instructions may be included on a computer readable storage medium (including but is not limited to disc storage, CD-ROM, optical storage, etc.) having computer readable program codes therein or thereon.

The present disclosure is described with reference to flow charts and/or block diagrams of the method, devices and systems according to examples of the present disclosure. Although the flow diagrams described above show a specific order of execution, the order of execution may differ from that which is depicted. Blocks described in relation to one flow chart may be combined with those of another flow chart. It shall be understood that each flow and/or block in the flow charts and/or block diagrams, as well as combinations of the flows and/or diagrams in the flow charts and/or block diagrams can be realized by machine readable instructions.

The machine-readable instructions may, for example, be executed by a general purpose computer, a special purpose computer, an embedded processor or processors of other programmable data processing devices to realize the functions described in the description and diagrams. In particular, a processor or processing apparatus may execute the machine-readable instructions. Thus, functional modules of the apparatus and devices may be implemented by a processor executing machine readable instructions stored in a memory, or a processor operating in accordance with instructions embedded in logic circuitry. The term 'processor' is to be interpreted broadly to include a CPU, processing unit, ASIC, logic unit, or programmable gate array etc. The methods and functional modules may all be performed by a single processor or divided amongst several processors.

Such machine-readable instructions may also be stored in a computer readable storage that can guide the computer or other programmable data processing devices to operate in a specific mode.

Such machine-readable instructions may also be loaded onto a computer or other programmable data processing devices, so that the computer or other programmable data processing devices perform a series of operations to produce computer-implemented processing, thus the instructions executed on the computer or other programmable devices realize functions specified by flow(s) in the flow charts and/or block(s) in the block diagrams.

Further, the teachings herein may be implemented in the form of a computer software product, the computer software product being stored in a storage medium and comprising a plurality of instructions for making a computer device implement the methods recited in the examples of the present disclosure.

While the method, apparatus and related aspects have been described with reference to certain examples, various modifications, changes, omissions, and substitutions can be made without departing from the spirit of the present disclosure. It is intended, therefore, that the method, apparatus and related aspects be limited only by the scope of the following claims and their equivalents. It should be noted that the above-mentioned examples illustrate rather than limit what is described herein, and that those skilled in the art will be able to design many alternative implementations without departing from the scope of the appended claims. Features described in relation to one example may be combined with features of another example.

The word "comprising" does not exclude the presence of elements other than those listed in a claim, "a" or "an" does not exclude a plurality, and a single processor or other unit may fulfil the functions of several units recited in the claims.

The features of any dependent claim may be combined with the features of any of the independent claims or other dependent claims.

The invention claimed is:

1. A print mode determination method, comprising:
receiving, using a processor, image data defining parameters of pixels of an image to be printed using a print apparatus;
identifying, using a processor and based on the image data, a first fill area in the image that exceeds a defined threshold area, wherein the first fill area is to be printed in a first color;
determining, using a processor and based on the image data, a first proportion of print agent of each of a plurality of colors to be used to print the first color; and
determining, using a processor and based on the determined first proportions of print agent of the plurality of colors, a print mode from a plurality of print modes to be used by the print apparatus to print the image, the print mode indicating a number of passes to be used by the print apparatus to print the image, wherein the number of passes to be used by the print apparatus corresponding to a greatest number of passes with a least amount of perceptible banding.

2. A method according to claim 1, further comprising:
operating the print apparatus to print the image using the determined print mode.

3. A method according to claim 1, further comprising:
providing the determined print mode of the print apparatus as a recommendation to an operator of the print apparatus.

4. A method according to claim 3, further comprising:
receiving, from an operator, a selection of a print mode of the print apparatus to be used to print the image; and
operating the print apparatus to print the image using the selected print mode.

5. A method according to claim 1, wherein determining the print mode is based on an inspection of a lookup table or database containing an indication of a corresponding print mode for each of a plurality of combinations of print agent proportions.

6. A method according to claim 1, further comprising:
determining, based on the image data, a geometrical distribution of pixels within the first fill area; and
determining the print mode further based on the determined geometrical distribution of pixels within the first fill area.

7. A method according to claim 1, further comprising:
identifying, based on the image data, a second fill area in the image that exceeds a defined threshold area, wherein the second fill area is to be printed in a second color;
determining, based on the image data, a second proportion of print agent of each of a plurality of colors to be used to print the second color;
determining which of the first fill area and the second fill area is the largest; and
determining, based on the determined proportions of print agent for the largest fill area, a print mode to be used by the print apparatus to print the image.

8. A method according to claim 7, further comprising:
determining, based on the image data, a geometrical distribution of pixels within the first fill area and a geometrical distribution of pixels within the second fill area; and
determining the print mode further based on the determined geometrical distribution of pixels within the first fill area and on the determined geometrical distribution of pixels within the second fill area.

9. A method according to claim 1, wherein determining the print mode is further based on a printable medium onto which the image is to be printed by the print apparatus.

10. A method according to claim 1, wherein the print mode comprises a number of passes to be made by a print agent distributor over a printable medium onto which the image is to be printed by the print apparatus during a printing operation.

11. A method according to claim 1, further comprising:
determining the print mode that is intended give rise to the fewest image quality defects when printing the image.

12. A method according to claim 1, wherein the first fill area is to be printed in only the first color.

13. An apparatus comprising:
a processor to:
receive image data representing an image to be printed using a print apparatus;
identify, based on the image data, a color block of a first color in the image, the color block having an area that exceeds a defined threshold area;
determine, based on the image data, a proportion of each of a plurality of colors of print agent to be used to print the first color; and
determine, based on the determined proportions of print agent of the plurality of colors, a print mode from a plurality of print modes to be used by the print apparatus to print the image, the print mode indicating a number of passes to be used by the print apparatus to print the image, wherein the number of passes corresponds to a greatest number of passes with a least amount of perceptible banding.

14. An apparatus according to claim 13, wherein the print apparatus is to print the image using latex print agent.

15. A non-transitory machine-readable medium comprising instructions which, when executed by a processor, cause the processor to:
identify, from data representing an image to be printed using a print apparatus, a first color fill region having an area that exceeds a defined threshold area, wherein the first color fill area is to be printed in a first color;
determine, from the data, a proportion of print agent of each of a plurality of colors to be used to print the first color; and
determine, based on the determined proportions of print agent, printing parameters to be applied to the print apparatus to print the image, the printing parameters including an indication of a number of passes to print the image, wherein the number of passes to be used by the print apparatus corresponding to a greatest number of passes with a least amount of perceptible banding.

16. A print mode determination method, comprising:
receiving, using a processor, image data defining parameters of pixels of an image to be printed using a print apparatus;
identifying, using a processor and based on the image data, a first fill area in the image that exceeds a defined threshold area, wherein the first fill area is to be printed in a first color;
determining, using a processor and based on the image data, a first proportion of print agent of each of a plurality of colors to be used to print the first color; and
determining, using a processor and based on the determined first proportions of print agent of the plurality of colors, a print mode from a plurality of print modes to be used by the print apparatus to print the image, the print mode indicating a number of passes to be used by the print apparatus to print the image, wherein the method further comprises:

determining, based on the image data, a geometrical distribution of pixels within the first fill area; and responsive to determining that the geometric distribution of pixels within the first fill area meets a defined criterion, determining the print mode further based on the determined geometrical distribution of pixels within the first fill area, wherein the defined criterion corresponds to whether the geometrical distribution of pixels has at least one of a width, thickness, or height greater than a corresponding defined threshold.

* * * * *